(No Model.)
E. E. ORRELL.
MECHANICAL MOVEMENT.
No. 357,499. Patented Feb. 8, 1887.
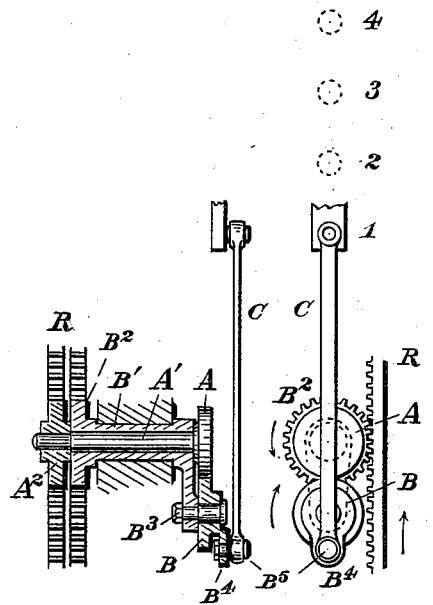
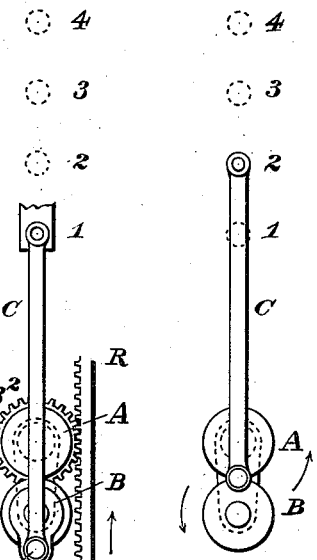
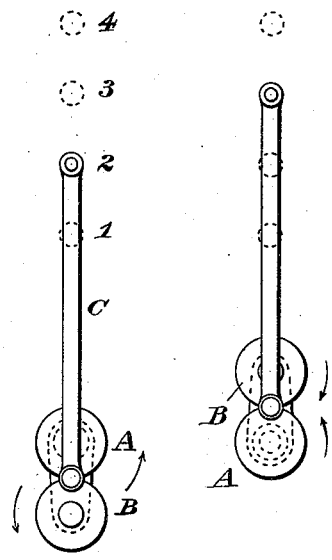
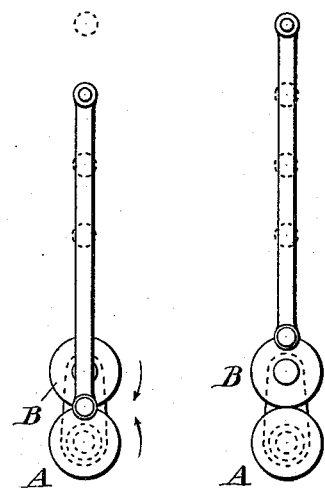
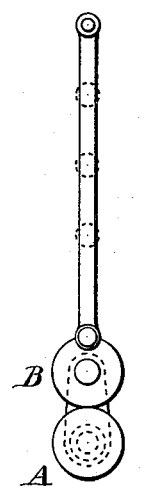
Fig. 1.  Fig. 2.  Fig. 3.  Fig. 4.  Fig. 5.
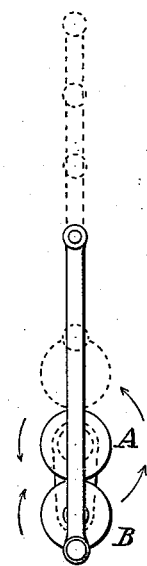
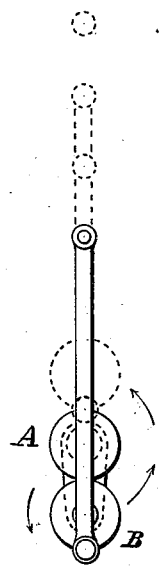
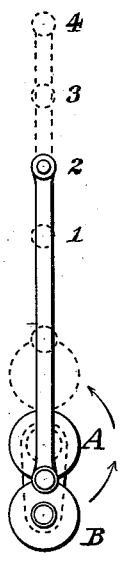
Fig. 6.  Fig. 7.  Fig. 8.
WITNESSES:
Edward F. Tolman.
Leroy M. Alexander.
INVENTOR
Ephraim E. Orrell
BY
Edward K. Hill,
ATTORNEY

UNITED STATES PATENT OFFICE.

EPHRAIM E. ORRELL, OF WARE, MASSACHUSETTS.

MECHANICAL MOVEMENT.

SPECIFICATION forming part of Letters Patent No. 357,499, dated February 8, 1887.

Application filed July 29, 1886. Serial No. 209,373. (No model.)

*To all whom it may concern:*

Be it known that I, EPHRAIM E. ORRELL, a citizen of the United States, residing at Ware, Hampshire county, State of Massachusetts, have invented an Improvement in Mechanical Movements, of which the following is a specification, illustrated by the accompanying drawings, in which—

Figure 1 is a sectional side elevation, and Fig. 2 is a front elevation, of the combination of parts constituting the mechanical movement. Figs. 3, 4, 5, 6, 7, and 8 are front elevations of that portion of the mechanism required to show the successive positions of the parts in operation, whereby the movement to be obtained may be more clearly illustrated.

The mechanical elements combining to constitute this movement may be seen in their relation to each other and in one position in Figs. 1 and 2, wherein A and B designate a pair of narrow-faced cylinders adapted to roll together by frictional contact of their faces; or the cylinders may be a pair of gears working together in the usual way. In most of the practical applications of this mechanical movement gears would be used; but for simplicity of illustration the cylinders are shown and will be designated as "friction-rolls," or simply "rolls." The roll A is fixed upon a shaft, A', while the roll B is mounted to turn free on a stud-pin, $B^3$, which is carried by a crank-arm projecting from a sleeve, B'. The shaft A' has its bearing within this sleeve, and projects through at both ends, the sleeve itself being surrounded and supported by a suitable bearing, in which it may freely turn. The rolls being thus mounted, having their faces in contact, it is evident that B may be rotated on its stud by turning A and its shaft A', the stud remaining stationary; or A may be stationary and the sleeve B', with its crank-arm, being turned, B will rotate concentrically about A, at the same time turning axially on the stud $B^3$ by the frictional contact of the faces; or, again, both shaft and sleeve may turn simultaneously in either direction, producing a motion in B compounded of axial rotation about the stud and concentric rotation around A. These mechanical elements arranged to give the described motions, when combined with a means of imparting rotation to the shaft and sleeve, and when also combined with a means of conveying and applying the resulting movements to other mechanism, are the essential features of my invention.

The means of imparting rotation to the shaft and sleeve may be any mechanism adapted to produce that result—as, for instance, the pair of racks R, Figs. 1 and 2, engaging with the pair of gears $A^2$ $B^2$, secured, respectively, to the shaft A' and the sleeve B', the racks having imparted to them a reciprocatory motion. The means of conveying and applying the resulting movements may be a link, C, connecting a crank-pin, $B^5$, on the gear B with a point where the movements are to be applied to other mechanism.

These movements, which it is the object of my invention to produce, consist of reciprocatory or intermittent progress over a given path in which are four points where motion may cease, and from any one of these four points movement may take place to any other of the four points, as the mechanism to be operated on may require.

Referring to Figs. 1 and 2, it may be seen that the path of motion there assumed for illustration is a vertical straight line having the four points in the path indicated by dotted-line circles, and each position designated by the corresponding numeral. The direction of this path is not essential. It may be any curve or combination of lines in any direction.

The object of my invention as thus set forth is attained by the mechanism described through the reciprocating action of the racks, determined by the will of the operator, directly or through automatic means applied in connection with the described parts.

One of the most familiar practical applications of this mechanical movement is to the well-known box-motion of fancy looms, where any one of four boxes is required to present itself at the level of the shuttle-race, according to the demands of the pattern being woven. In such an application the movement of the racks would be determined by the pattern-chain, and the link would connect with the box-rod, the manner of which will be evident to those familiar with the subject.

Having thus generally described the invention and its object, I will point out in detail how the movements are produced.

The racks R must be adapted to give a single stroke either forward or back, as required, and to act independently of each other. They are shown as acting in a vertical direction, and the stroke must be up or down. The length of stroke is in the present case such as to give one-half a revolution to the gears $A^2 B^2$, though this is not essential to obtaining the object of the invention. The crank-pin $B^3$ is shown as attached to an arm, $B^4$, projecting from the roll B, the object being to admit of applying the pin at a distance from the center of roll equal to the radius of the roll, which proportion is necessary if the spaces between the four positions in the path of motion are to be equal. Assume the parts to be as in Fig. 2, and it is desired that movement shall take place from position 1 to position 2. Give to the rack operating gear $A^2$ a stroke upward, gear $B^2$ remaining as it is. Gear $A^2$, shaft $A'$, and roll A are turned one-half a revolution, and consequently roll B, with its crank-pin, is turned the same, as indicated by the arrows, thus through the link C advancing the point of application from position 1 to position 2, as required, the new arrangement of the parts being seen in Fig. 3. If we now desire to proceed from position 2 to position 3, the rack operating A, which has just made an ascending stroke, is caused to descend, bringing the crank-pin on B into what would be the same position it started from, were it not that at the same time the rack operating the sleeve makes a stroke upward, turning the sleeve, and with it the arm upon which is the roll B, into the position seen in Fig. 4.

The result of moving both racks in the directions mentioned is indicated by the arrows in Fig. 3, and the resulting position of the parts is shown in Fig. 4, which gives the third position, as required. To attain the fourth position from the third, it is only necessary to give B a half-revolution through A by giving its rack (which has just made a downstroke) an upstroke, the motions being indicated by arrows in Fig. 4 and the resulting position by Fig. 5.

It will be evident that with both racks up it is only necessary to give the reverse strokes to those described to give the several positions successively from fourth to first. To proceed from the first to the fourth position direct, it is necessary to give both racks an upstroke, when the motions shown by the arrows in Fig. 6 will take place, giving the fourth position, as indicated by the dotted lines. In Fig. 7 the movement from the first to the third position is illustrated. The rack turning the sleeve is given an upstroke, A remaining stationary, while B rolls around it, carried by the arm on the sleeve, thus coming into the third position, as seen in the figure. The movement from the second to the fourth position is obtained by giving an upstroke to the rack turning the sleeve, the roll A remaining stationary, while the roll B is swung on the arm, turning with the sleeve into its upper position, at the same time turning a half-revolution by contact with A, thus arriving at the desired fourth position, the movements in this case being indicated by Fig. 8.

It is evident that the reverse of the movements from one position to another will result from a reversal of the action of the racks, and by inspection it will appear that the movements described, together with the corresponding reverse movements, will include all that can be made in going from any one to any other one of the four positions, thus fulfilling the stipulated conditions.

I am not limited to the precise way of obtaining each movement as herein described, but may obtain several of them by different combinations of rack movement. Neither am I limited to the use of rolls or gears of equal diameter, or to giving an exact half-revolution to the rolls. Any change in these proportions will result in making the position spacing unequal and vary the time relations of the various movements; but the general result from the employment of my improvement remains the same.

Having thus described my invention, I claim—

A mechanism for giving to a point a motion over a path in which are four positions, from any one of which positions movement of the point may be had to any other one of the positions, said mechanism consisting of the roll or gear A, the shaft $A'$, and the gear and rack $A^2$ R, or their equivalent devices, for rotating the roll or gear, in combination with the roll or gear B, the sleeve $B'$, or its equivalent, and the gear and rack $B^2$ R, or their equivalent devices, for rotating the sleeve, and with it the roll or gear B, concentrically around A, substantially as described.

EPHRAIM E. ORRELL.

Witnesses:
GEORGE G. HALL,
JAMES E. CLARK.